UNITED STATES PATENT OFFICE 2,333,666

DIALKYL ESTERS OF UNSATURATED DICARBOXYLIC ACIDS AS INSECTICIDES

William Moore and Richard O. Roblin, Jr., Stamford, Conn., assignors to American Cyanamid Company, New York, N. Y., a corporation of Maine No Drawing. Application September 14, 1940, Serial No. 356,858

6 Claims. (Cl. 167—22)

The present invention relates to insecticides and is concerned more particularly with a series of compounds which have proven especially effective as contact poisons for the control of insects and allied pests and their eggs.

We have discovered that the dialkyl esters of aliphatic dicarboxylic acids in which there is an unsaturated linkage between the carbon atoms which carry the carboxyl groups possess powerful insecticidal and ovicidal activity against sucking, soft-bodied and scale insects and their eggs, for example the bean aphid, the citrus red spider and red scale, and that such activity is attained without any substantial harmful or detrimental action on the vegetation infested with the insect.

Typical examples of such compounds include dimethyl fumarate, diethyl maleate, dipropyl fumarate, diisopropyl maleate, diallyl maleate, dibutyl fumarate, diamyl maleate, diisoamyl fumarate, diheptyl maleate, di(2-ethyl-hexyl) fumarate, dicapryl fumarate, di(2-ethylhexyl) maleate, didodecyl fumarate, ditetradecyl fumarate, ditetradecyl maleate, and dioctadecyl fumarate.

The following example illustrates a general method of preparing the above compounds in accordance with the invention.

EXAMPLE

A mixture of 50 grams (0.43 mol) of fumaric acid, 150 g. (1.70 mol) of isoamyl alcohol, 10 cc. of sulfuric acid (catalyst), and 50 cc. of benzene (solvent) was heated under reflux for ½ hour. The liquid was washed with dilute caustic soda solution and then with water. After removal of the benzene and excess isoamyl alcohol the product was distilled under vacuum at 0.5 mm. 105 g. (95% of theory) of diisoamyl fumarate were obtained as a colorless liquid boiling at 105° C.

Spray solutions were prepared by dissolving the insecticidal compounds in a solvent medium consisting of 65% acetone and 35% water. Table 1 shows the kills obtained under comparable conditions for the various dilutions when the sprays were applied to red spiders and aphids.

Table 1

| Insect | Compound | Dilution | Kill |
|---|---|---|---|
| Citrus red spider | Diallyl maleate | 1–500 | Percent 100 |
| Do | do | 1–1,000 | 43.6 |
| Do | Diamyl maleate | 1–500 | 100 |
| Do | do | 1–1,000 | 95.3 |
| Do | Diisoamyl fumarate | 1–1,000 | 100 |
| Do | do | 1–2,000 | 75 |
| Do | Di(2-ethylhexyl) fumarate | 1–2,000 | 100 |
| Do | do | 1–4,000 | 74.1 |
| Do | Dicapryl fumarate | 1–2,000 | 100 |
| Do | do | 1–5,000 | 76.5 |
| Do | Didodecyl fumarate | 1–2,000 | 100 |
| Do | do | 1–5,000 | 75.5 |
| Do | Ditetradecyl fumarate | 1–500 | 100 |
| Do | do | 1–1,000 | 96.7 |
| Black bean aphid | Diallyl maleate | 1–500 | 80.2 |
| Do | Diisoamyl fumarate | 1–500 | 100 |
| Do | do | 1–1,000 | 55.7 |
| Do | Di(2-ethylhexyl) fumarate | 1–500 | 87.2 |
| Do | Di(2-ethylhexyl) maleate | 1–500 | 99.1 |
| Do | Dicapryl fumarate | 1–500 | 95.3 |
| Do | Didodecyl fumarate | 1–500 | 100 |
| Do | do | 1–1,000 | 67.8 |

Water emulsions of the insecticidal compounds were prepared using dioctyl sodium sulphosuccinate (1–10,000 dilution) as the emulsifier and wetting agent. Table 2 shows the kills obtained at a dilution of 1–1000 when sprays of the emulsions were applied to active stages of the citrus red spider.

Table 2

| Compound | Kill |
|---|---|
| Diisoamyl fumarate | Percent 81.2 |
| Di(2-ethylhexyl) fumarate | 100 |
| Di(2-ethylhexyl) maleate | 89.6 |
| Dicapryl fumarate | 90.8 |
| Didodecyl fumarate | 96.5 |
| Ditetradecyl fumarate | 100 |

Heretofore most insecticides have shown a wide difference of toxicity in combating red spider mites as compared to the effect on their eggs. In many instances the insecticidal substance would destroy the mite and then be found substantially non-toxic to its eggs. The series of compounds of the present invention have proven to be equally effective on both the mite and its eggs, as shown by the percentage-kills given in Table 3. The compounds were applied in water emulsion sprays using dioctyl sodium sulphosuccinate (1-10,000 dilution) as the emulsifying agent.

Table 3
[Mean percentage of three tests]

| Compound | 1-500 dilution | | 1-750 dilution | | 1-1,000 dilution | |
|---|---|---|---|---|---|---|
| | Red spider | Eggs | Red spider | Eggs | Red spider | Eggs |
| Di(2-ethylhexyl) fumarate | 100 | 98.2 | 99.2 | 92.9 | 98.9 | 82 |
| Didodecyl fumarate | 99.1 | 99.2 | 99.4 | 94.7 | 93.2 | 97 |
| Ditetradecyl fumarate | 100 | 100 | 92.8 | 99 | 91.5 | 97.2 |

These compounds are particularly effective in penetrating the coverings of scale insects and hence destroy the insect more readily than substances commonly employed, such as for example mineral and vegetable oils. Table 4 shows the kills obtained on the resistant California red scale with the insecticides applied in water emulsion sprays (dioctyl sodium sulpho-succinate as the emulsifier, 1-10,000 dilution).

Table 4

| Insecticide | Dilution | Kill |
|---|---|---|
| | | Percent |
| Kerosene | 1-50 | 10.7 |
| Cottonseed oil | 1-100 | 55.6 |
| Light mineral oil | 1-100 | 16.6 |
| Medium heavy mineral oil | 1-100 | 75.5 |
| Do | 1-200 | 25.3 |
| Di (2-ethylhexyl) maleate | 1-100 | 100 |
| Di (2-ethylhexyl) fumarate | 1-100 | 100 |
| Do | 1-140 | 100 |
| Do | 1-200 | 68.2 |

These compounds may also be used in conjunction with other insecticides to increase their effectiveness on insects such as mealy bugs which have considerable wax to penetrate before kill may be obtained. Table 5 shows the kills obtained when the insecticides were applied in water emulsions to mealy bugs.

Table 5

| Insecticide | Dilution | Kill |
|---|---|---|
| | | Percent |
| Dibenzylglycinonitrile | 1-500 | 79.3 |
| Di(2-ethylhexyl) fumarate | 1-500 | 42.5 |
| Dibenzylglycinonitrile } together | 1-500 | } 100 |
| Di(2-ethylhexyl) fumarate | 1-500 | |
| Dibenzylglycinonitrile } together | 1-1,000 | } 84.8 |
| Di(2-ethylhexyl) fumarate | 1-500 | |

Although the dialkyl esters of maleic and fumaric acid have been found particularly outstanding in their effectiveness, the dialkyl esters of other unsaturated dicarboxylic acids such as for example those of the citraconic and mesaconic acids may also be utilized.

While the invention has been described with particular reference to specific embodiments it is to be understood that it is not to be limited thereto but is to be construed broadly and restricted solely by the scope of the appended claims.

We claim:

1. An insecticidal composition containing di(2-ethylhexyl) fumarate.

2. A method of combatting sucking, soft-bodied and scale insects and their eggs which includes applying thereto a toxic quantity of di(2-ethylhexyl) fumarate.

3. An insecticidal composition containing a toxic amount of di(2-ethyl hexyl) fumarate and dibenzyl glycinonitrile.

4. A method of combatting sucking, soft-bodied and scale insects and their eggs which includes applying thereto a toxic quantity of di(2-ethyl hexyl) fumarate and dibenzyl glycinonitrile.

5. An insecticidal composition containing a dialkyl ester of a lower aliphatic dicarboxylic acid which contains a double bond between the adjacent carbon atoms which carry the carboxyl groups.

6. A method of combating sucking, soft-bodied and scale insects and their eggs, which includes applying thereto a toxic quantity of a dialkyl ester of a lower aliphatic dicarboxylic acid which contains a double bond between adjacent carbon atoms which carry the carboxyl group.

WILLIAM MOORE.
RICHARD O. ROBLIN, JR.